(12) United States Patent
Lampru

(10) Patent No.: US 8,167,426 B2
(45) Date of Patent: May 1, 2012

(54) EYEGLASS TEMPLE ASSEMBLY AND COVER

(76) Inventor: Demetrio Lampru, North Miami, FL (US)

( * ) Notice: Subject to any disclaimer, the term of this patent is extended or adjusted under 35 U.S.C. 154(b) by 0 days.

(21) Appl. No.: 12/425,894

(22) Filed: Apr. 17, 2009

(65) Prior Publication Data

US 2010/0265453 A1    Oct. 21, 2010

(51) Int. Cl.
*G02C 11/02* (2006.01)
(52) U.S. Cl. .......................................... 351/52; 351/111
(58) Field of Classification Search .................. 351/41, 351/51, 52, 111, 112, 122, 158
See application file for complete search history.

(56) References Cited

U.S. PATENT DOCUMENTS

| | | |
|---|---|---|
| 2,003,603 A | 6/1935 | McKernan |
| 3,021,753 A * | 2/1962 | Vinson .......................... 351/52 |
| 4,786,158 A | 11/1988 | Barfus-Shanks et al. |
| 4,968,128 A | 11/1990 | Mendola |
| 5,007,728 A | 4/1991 | Magorien |
| 5,098,180 A | 3/1992 | Tobey |
| 5,440,355 A | 8/1995 | Ross |
| 5,583,583 A | 12/1996 | Wilson |
| D389,853 S | 1/1998 | Kosakowski |
| 6,059,411 A | 5/2000 | Moody |
| 6,089,707 A * | 7/2000 | Shapiro .......................... 351/47 |
| 6,207,217 B1 | 3/2001 | Peoples et al. |
| 7,043,796 B2 | 5/2006 | Marc et al. |
| 7,104,646 B2 | 9/2006 | Yang |
| 7,261,409 B1 | 8/2007 | Taber |
| 2002/0003603 A1 | 1/2002 | Bullard, Jr. |
| 2002/0003604 A1 | 1/2002 | Yahuchi |
| 2003/0020866 A1 | 1/2003 | Asano |
| 2003/0038919 A1 | 2/2003 | Lin |
| 2005/0231681 A1 | 10/2005 | Spitzer |
| 2005/0280772 A1 | 12/2005 | Hammock et al. |
| 2006/0244901 A1 | 11/2006 | Maling |
| 2007/0153229 A1 | 7/2007 | Yasuhara et al. |
| 2008/0284975 A1 | 11/2008 | Negishi et al. |

FOREIGN PATENT DOCUMENTS

GB          2 184 862      *   7/1987 ................. 351/52

* cited by examiner

*Primary Examiner* — Huy K Mai

(57) ABSTRACT

An eyeglass temple works with an interchangeable eyeglass temple cover to change the appearance of the eyeglasses. A clip on the eyeglass temple is used to secure the cover to the eyeglass temple. The temple cover can be made of silicone and include a hole to make inserting and removing the temple cover easier.

23 Claims, 4 Drawing Sheets

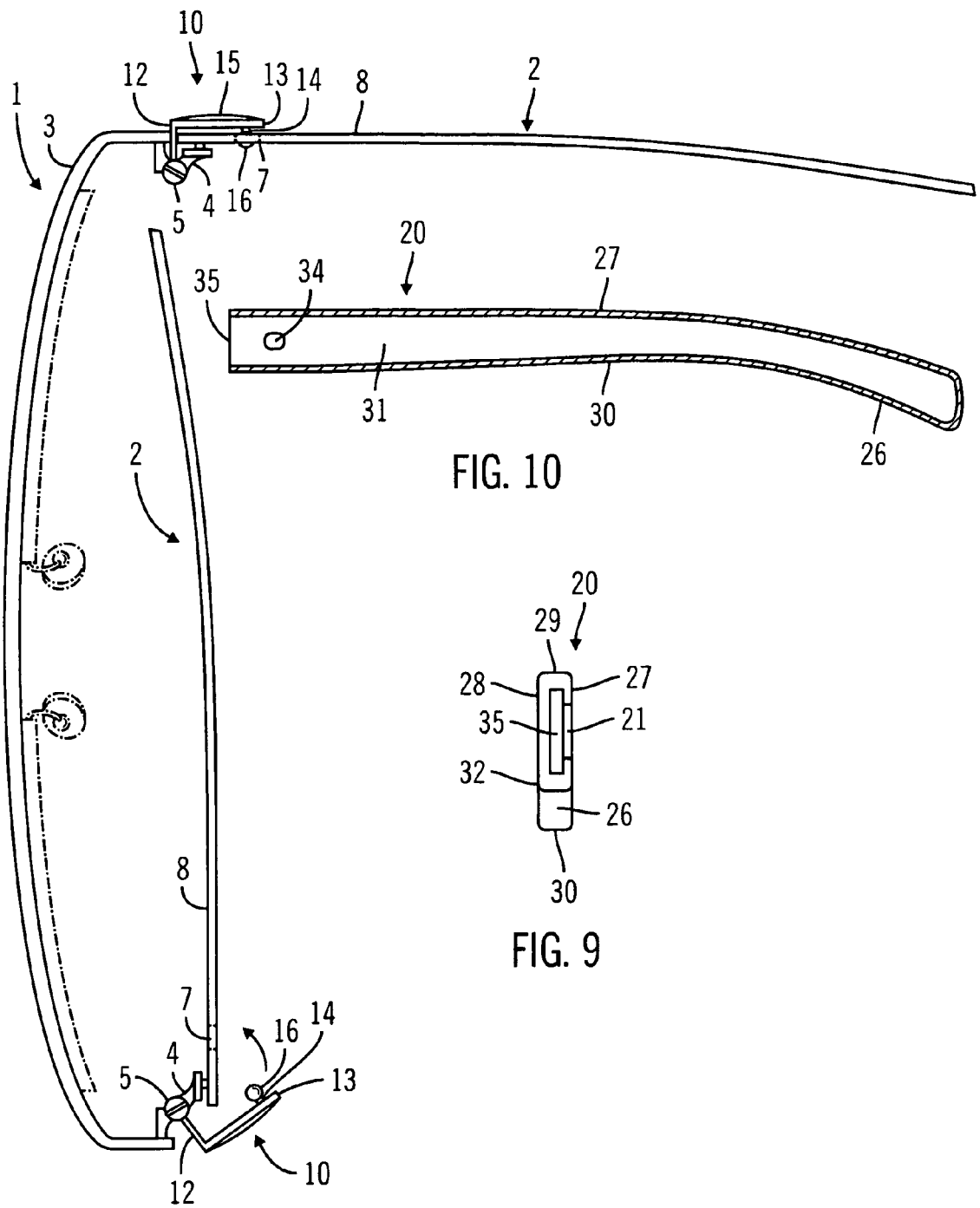

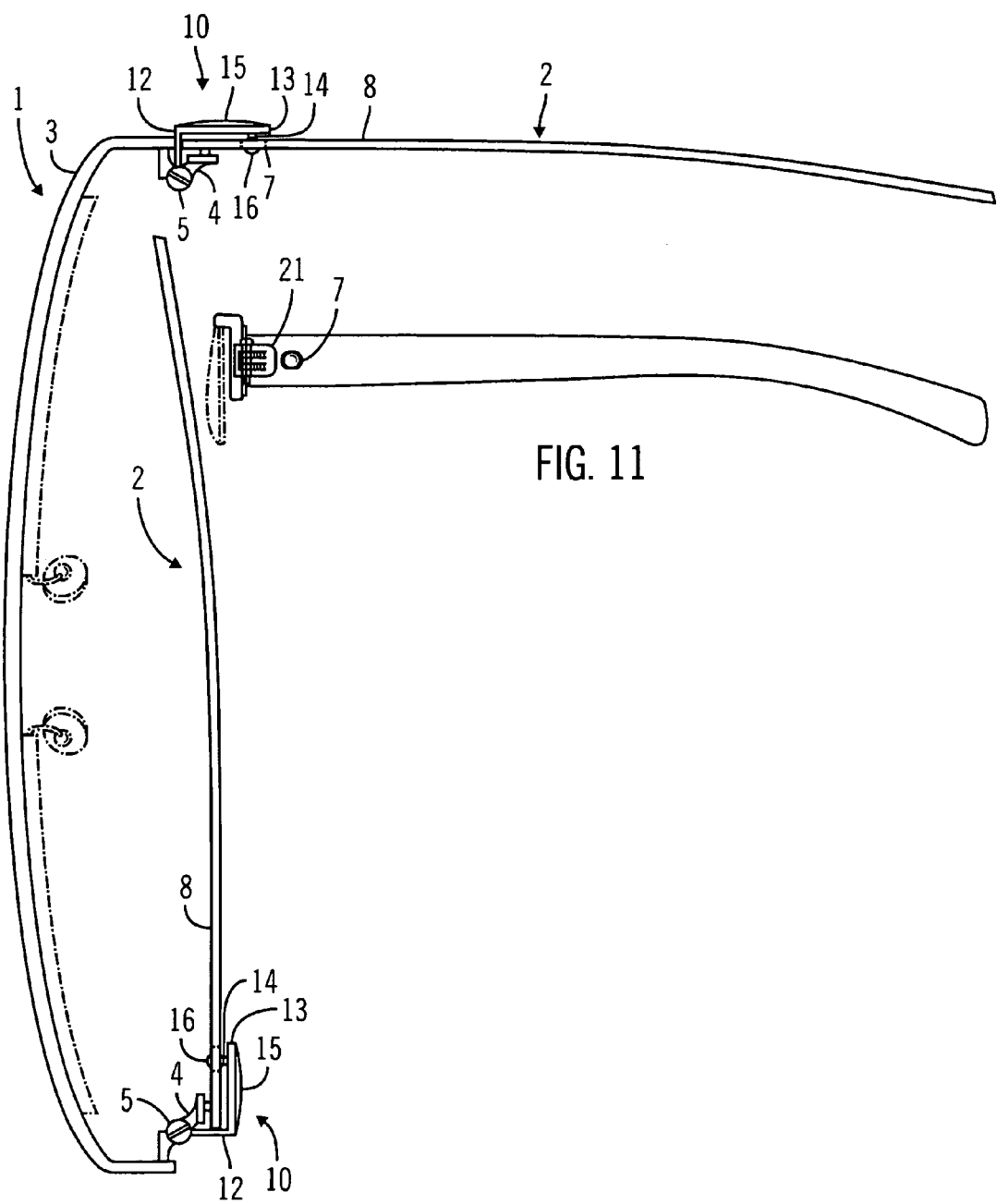

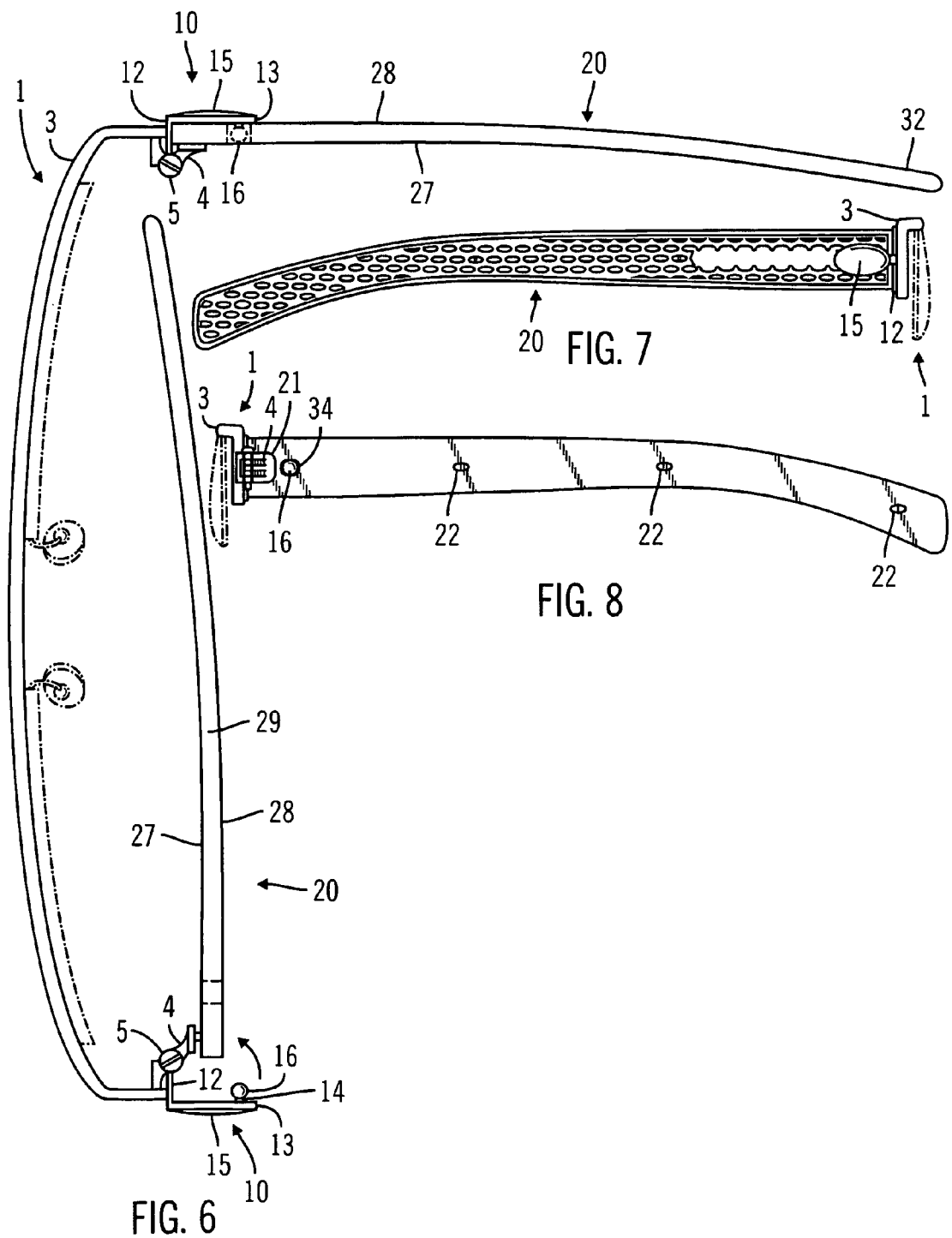

EYEGLASS TEMPLE ASSEMBLY AND COVER

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates to eyeglass temples and covers for eyeglass temples.

2. Description of the Related Art

The prior art teaches disposable plastic sleeves that are used to cover and protect existing glasses from damage in particular situations. The cover can be used to protect glasses during shipping, during hair treatments, or while working in hazardous environments. The prior art does not teach covers that change the aesthetic appearance of the underlying glasses to a new more desired appearance.

Kosakowski Des. 389,853 teaches an Eyeglass Sidebar Protector. The Protector is a sleeve that fits over the stem of a pair of eyeglasses. No clasp is taught. The patent is silent as to the materials.

Lizzi U.S. Pat. No. 6,207,217 teach an Eyeglass Frame Protector Dispensing System and Method. The system includes coverings formed on sheets. No clasp is taught. The coverings are made of lightweight, flexibly formed plastic.

Barfus-Shanks et al. U.S. Pat. No. 4,786,158 teach a Protective Cover for Eyeglass Temple Pieces and Method. To begin, Barfus-Shanks et al. provides a survey of the prior art. A soft tubular member for protecting the eyeglass sidepiece is provided. An elastic member is provided on the distal end of the tubular member. The elastic member helps to secure the soft tubular member to the stem. The material more distal than the elastic member can be pulled back on the sleeve. No clasp is taught. The stem is a fully actuated stem before the tubular member is added. The tubular member is merely an additional protection. The material of the tubular member is not silicon.

Ross U.S. Pat. No. 5,440,355 teaches a Comfortable Eyeglass Cover. The eyeglass cover is a hollow tube made of felt. An elastic member is included in the cover to help hold the cover on the eyeglass temple. No clasp is taught. The cover is an auxiliary cover. The material is not silicon. No holes are taught nor are they suggested because felt is inherently porous.

Taber U.S. Pat. No. 7,261,409 teaches an Eyeglass Frame with Integral Channel to Receive Decorative Inserts. The frame also inserts to be slid into a channel in the temple of the eyeglass frame. The inserts change the appearance of the eye frame. No clip is taught. The insert does not slide over the temple. The insert is not silicone.

Mendola U.S. Pat. No. 4,968,128 teaches an Eyeglass Frame Ornamentation. More specifically, Mendola teaches a clip that holds ornamentation on the frame. The clip is not integral to the frame. The clip works like a clam shell grasping the eye frame. The clasp does not have a pin to secure the ornament to the temple. The temple does not have hole to receive such a pin.

BRIEF SUMMARY OF THE INVENTION

It is accordingly an object of the invention to provide an eyeglass temple assembly that overcomes the above-mentioned disadvantages of the heretofore-known devices of this general type and to provide an interchangeable cover for changing the appearance of eyeglasses.

An object of the invention is to provide an eyeglass assembly that can have a customizable appearance.

A further object of the invention is to provide an eyeglass assembly that has similar dimensions, for example, temple thickness as traditional, unchangeable eyeglasses.

A further object of the invention is to provide an eyeglass assembly with a locking mechanism for an interchangeable cover that appears as closely as possible as non-customizable eye frame.

A further object of the invention is to provide an eyeglass assembly that can receive customizable covers made of silicone plastic to complement a brand of watches with interchangeable silicone plastic watch bands.

With the foregoing and other objects in view there is provided, in accordance with the invention, an eyeglass temple assembly. The eyeglass temple assembly is configured to receive, support, and fasten an eyeglass temple cover. The eyeglass temple includes an arm, a clasp, and a pin.

The eyeglass temple assembly includes an arm, which may also be known as an eyeglass stem or an eyeglass temple. The arm is configured to be connected to an eyeglass rim. Typically, the arm is configured to connect to the eyeglass rim is done by attaching part of a hinge to an inner surface of the arm. Eyeglass rim is meant to mean the front piece of eyeglasses. In eyeglasses with a rim, eyeglass rim can include the plastic rim surrounding the lens. In rimless eyeglasses, the eyeglass rim may be the lens itself. The arm ends with an earpiece for resting on the top of a wearer's ear. The arm has an arm socket formed therein. The arm socket may be formed only into a partial depth of the arm. Alternatively, the arm socket may be made completely through the arm.

The arm is configured, that is it has a size and shape that allow the eyeglass temple cover to be inserted over the arm.

A pin disposed is removably insertable into the arm socket. The pin is configured to insert into an opening, also referred to as a socket, in the eyeglass temple cover when the eyeglass temple cover is installed. When the cover is installed, the socket in the cover and the socket in the arm are configured to overly each other. When the pin is inserted through the cover and the arm, the cover is held in place on the arm.

A clasp can be connected to the pin. The clasp overlaps the arm and is configured to overlap the eyeglass temple cover when the cover is inserted. The clasp can help to secure the cover by sandwiching at least a layer of the cover between the arm and the clasp.

The eyeglass temple assembly can include a clasp hinge. The clasp hinge connects, and preferably interconnects, the arm and the clasp. The hinge allows the clasp and pin to be moved relative to the arm. By moving relative to the arm, the pin can be inserted into and retracted from the arm socket. Inserting the pin locks the cover on the arm and removing the pin unlocks the cover.

A ball can be disposed on the pin. The ball is narrower (i.e. has a smaller diameter) than the arm socket. By being smaller, the ball fits within the arm socket. The shape of the ball tends to help the pin seat within the socket even if the socket is bent slightly out of perfect alignment. By being a ball mounted on a post, the cover tends to seat between the surface of the ball facing the clasp. The cover is then held between the ball and the clasp.

The clasp can be placed on an exterior, lateral surface of the arm to decorate the eyeglasses. Each arm has an external, lateral surface: e.g. the left arm has a left external surface and the right arm has a right external surface. When the clasp overlaps the external lateral surface, the clasp can decorate the eye frame. The clasp can be ornamented, for example, with a brilliant. The clasp can also be ornamented with branding and/or a logo.

The eyeglass temple assembly can be made of a thin sheet. The sheet can be made of metal or plastic. Because the arm will be covered with the cover, the arm can be narrower than the ultimate width when a cover is in place over the arm. Because the arm without a cover is narrower than a typical arm, the arm may be so narrow that it is uncomfortable when worn without a cover.

The eyeglass temple assembly can be made so that the clasp is integral to the arm. This contrast auxiliary and after market clasps and protectors. A part of the clasp hinge can be formed integrally (i.e. not removable) on the arm. The part of the clasp can be welded, glued, forged, or otherwise adhered to the arm.

In embodiments where the clasp is integral with the arm, the arm can be intended to be used only with a cover in place over the arm. To keep the overall width of the cover and arm within normal limits, the arm may be narrower than a prior-art arm. Accordingly, the arm can be eight tenths of a millimeter or narrower (<0.8 mm). A most preferred width is seven tenths of a millimeter (0.7 mm).

In accordance with a further object of the invention, a cover for changing an aesthetic of an eyeglass arm is provided. The cover is a plastic sleeve that has a passage with an opening formed therein, like a sock. The cover is slid over the arm of the eyeglass. The earpad of the arm is fed in the hole in the cover. The shape of the passage complements the shape of the eyeglass arm. The sleeve has a sleeve socket formed in the sleeve. The sleeve socket is configured and located on the sleeve to receive the pin of the arm. When the pin is inserted in the sleeve socket, the sleeve is secured on the eyeglass arm.

The plastic sleeve can have a further sleeve socket located on an opposite side of the passage from the first sleeve socket. The pin on the arm can be inserted through both sleeve sockets.

The plastic sleeve is formed of a flexible material that is pliable enough to be inserted on the arm. The cover can be made of silicone. The cover can be made of leather.

The sleeve can include an air hole reaching the passage. The air hole should be located distally compared to the hole for inserting the arm. The air hole allows air caught in the passage to escape as the arm is inserted. The air hole allows air to enter the passage as the arm is removed from the cover. A plurality of holes can be included along the length of the passage.

The plastic sleeve of the cover can have a notch formed therein. The notch abuts the opening in the sleeve. The notch is configured to receive at least part of a hinge disposed on the eyeglass arm. Eyeglass arms typically have at least a part of a hinge disposed on their inner surface. The hinge joins the arm to the front of the eye frame. The notch in the sleeve allows the sleeve to slide up the entire length of the arm so that the entire arm is covered.

The plastic sleeve can be textured. For example, a bumpy or grip-improving texture can be imparted on the outer surface of the sleeve. The texture can be imparted by molding the sleeve. The texture can be included to impart a desired ornamental quality to the sleeve.

Ornaments can be disposed in the cover. Ornaments can be molded into the cover as well.

In accordance with the objects of the invention, an eyeglass temple assembly with a changeable appearance is provided. The assembly combines the arm and cover that were described previously.

The eyeglass temple assembly (i.e. the arm and the cover) can be intended always to be used together. In such a case, the cover is not an aftermarket accessory. The cover completes the arm. The arm can include and integrally formed clip hinge. The arm can be made narrower than a normal arm so that the assembly including the cover can have a width equaling a customary eyeglass.

The arm and cover can be aftermarket or auxiliary covers that can be added to ordinary glasses. In such cases, a clip can be added to the arm. The cover is slid onto the arm and then secured by the clip.

Other features that are considered as characteristic for the invention are set forth in the appended claims.

Although the invention is illustrated and described herein as embodied in an eyeglass temple assembly and a cover for the eyeglass temple assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 4 is a top side view of the eyeglass temple assembly shown in FIG. 3 with the left clasp partially closed.

FIG. 5 is a top side view of the eyeglass temple assembly shown in FIGS. 3-4 with the left clasp fully closed.

FIG. 6 is top side view of the eyeglass temple shown in FIGS. 3-5 with a right cover installed and locked with the clasp and the left cover installed with the clasp unlocked.

FIG. 7 is a right side view of the right temple shown in FIG. 6 with the cover installed and the clasp closed.

FIG. 8 is a left side view of the right temple shown in FIG. 7 with the cover installed and the clasp closed.

FIG. 9 is a front side view of the cover shown in FIGS. 1-2.

FIG. 10 is a left side sectional view of the right temple shown in FIG. 8.

FIG. 11 is a right side view of a right arm of the eyeglass temple assemble shown in FIGS. 3-5 without a cover.

DETAILED DESCRIPTION OF THE INVENTION

Figure 1:
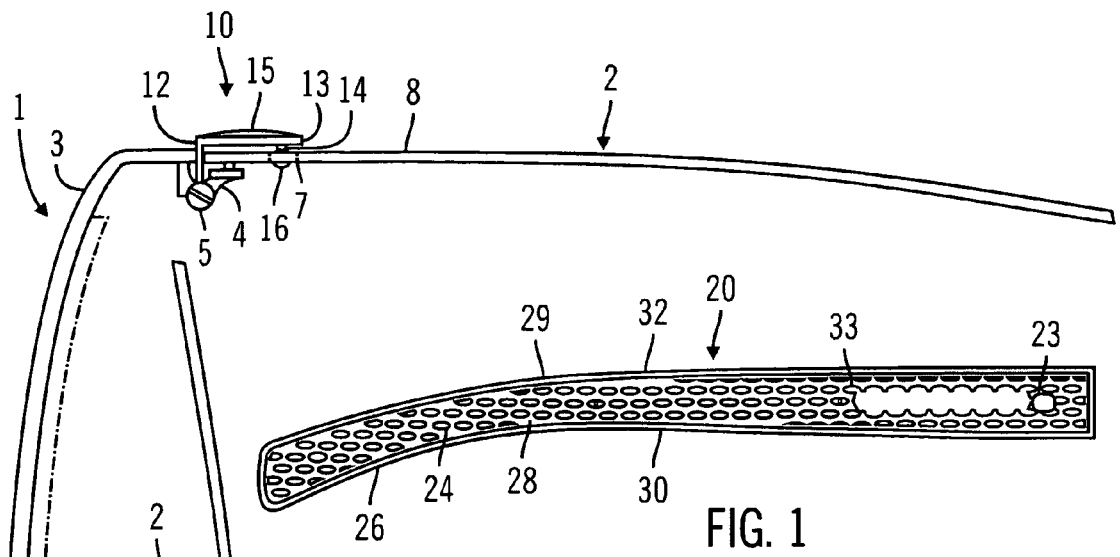
FIG. 1 is a diagrammatic right side view of a cover according to the invention for covering a right eyeglass temple.
Figure 2:
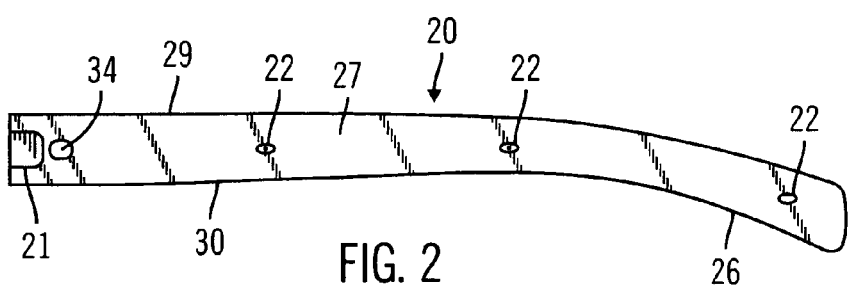
FIG. 2 is a left side view of the cover shown in FIG. 1.

Referring now to the figures of the drawing in detail and first, particularly, to FIGS. 1-2 and 9-10 thereof, there is seen an eyeglass temple cover 20. The eyeglass temple cover 20 is in the form of a sleeve 32 with a distal opening 35. The opening 35 allows an arm 2 to be inserted in the sleeve 32. The sleeve 32 is shaped to complement the shape of the arm 2. The sleeve 32 is slightly larger than the arm 2.

The eyeglass temple cover 20 has a top 29, a bottom 30, an inner surface 27 and an outer surface 28. A cover earpad 26 is formed as the bottom 30 curves downward. A sleeve socket 23 is formed in the outer surface 28 for receiving a pin 14. A further sleeve socket 34 is formed in the inner surface 27. The sleeve sockets 23 and 34 are aligned so a pin 14 can be inserted through both. A sleeve ornament 33 is added to the outer surface 28. In the embodiment shown, the sleeve ornament 33 is a brand name; other ornaments are possible.

A texture 24 is added to the outer surface 28. The texture 24 changes the appearance of the eyeglass temple cover 20. The texture 24 also helps a wearer grip the eyeglass temple cover 20 when installing or removing the eyeglass temple cover 20 from an arm 2.

A notch 21 is formed in the inner surface 27. The notch 21 complements the size and shape of a stem hinge part 36 that is disposed on the arm 2.

Three holes 22 are formed in the sleeve 32 and reach the passage 31. The holes are formed in the sleeve proximally (i.e. rear) relative to the opening 35. The holes 22 allow air to escape the passage 31 when the arm 2 is being inserted or removed in the passage 31.

The eyeglass temple cover 20 is made of a soft plastic material. The eyeglass temple cover 20 is made of a material including a silicone gel.

In a preferred embodiment of the invention, the length of the eyeglass temple cover 20 is one hundred thirty millimeters (130 mm). The height of the eyeglass temple cover 20 at the cover earpiece 26 is three and eighty-six hundredths millimeters (3.86 mm). The depth of the notch 21 is one and twenty-four hundredths millimeters (1.24 mm) deep. The notch 21 is one and ninety-nine hundredths millimeters (1.99 mm) tall. The height of the cover 20 at the distal end is seven and four hundredths millimeters (7.04 mm) tall.

Figure 3:
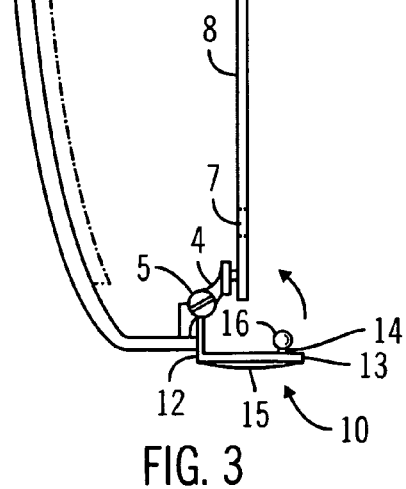
FIG. 3 is top side view of an eyeglass temple assembly according to the invention without a cover being installed; the left temple is in a folded position with a clasp in an open position; the right temple is in an unfolded position with the clasp in a closed position.

FIGS. 3-5 show an embodiment of the eyeglass temple assembly according to the invention. The eyeglass temple assembly includes eyeglasses 1 that have an eyeglass rim 3. The eyeglass rim 3 connects to the arm 2 (which is also known as a temple or a stem) by a hinge. The hinge includes a hinge part disposed on the eyeglass rim 3 and a hinge part 4 disposed on an inner surface of the arm 2. In the preferred embodiment, the hinge part 4 is soldered on the arm 2. A screw 5 interconnects the hinge parts. The arm 2 swivels about the screw 5 relative to the eyeglass rim 3 from an unfolded position shown in the right arm 2 compared to the folded position of the left arm 2. As shown in FIG. 11, the arm 2 has an earpiece 6 that rests upon a wearer's ear.

The arm 2 is made of metal. The arm 2 can be manufactured by stamping it from a sheet.

As shown in FIG. 10, the passage 31 in the eyeglass temple cover 20 is approximately the same size but slightly larger than the arm 2. In the preferred embodiment, the passage 31 is two to three millimeters (2-3 mm) larger in each dimension except length than the arm 2.

A clasp 10 is included in the eyeglass temple assembly for attaching a cover. The clasp 10 moves relative to the arm 2 to open and close. FIG. 3 shows the left clasp 10 in an open position. FIG. 4 shows the left clasp 10 in a partially open position. FIG. 5 shows the left clasp 10 in a closed position. The clasp 10 includes a clasp arm 12 that connects to the hinge. A plate 13 connects to the clasp arm 12. The plate 13 overlaps the outer later surface 8 of the arm 2. As described below, the plate 13 sandwiches the eyeglass temple cover 20 when the cover is installed and the clasp is in the closed position; see the right arm in FIG. 6.

The clasp 10 includes a pin 14. The pin 14 extends inward from the plate 13. The pin 14 is used (as described below) to fasten an eyeglass temple cover 20 onto the arm 2. The pin 14 inserts into the arm socket 7. In the preferred embodiment shown, the pin 14 extends through the arm socket 7. A clasp ornament 15 is disposed on the plate 13. In the preferred embodiment, the clasp ornament 15 identifies the manufacturer's brand. In other embodiments, the clasp ornament 15 is a brilliant.

A ball 16 is provided on the end of the pin 14. The ball helps the pin 14 to be inserted in the arm socket 7 even when the pin 14 has been bent off center. The ball 16 also prevents damage to the eyeglass temple cover 20 that could be made by the pin 14 if the pin 14 were uncovered.

The arm 2 is thinner than a typical eyeglass arm. By being thinner, an eyeglass temple cover 20 can be placed over the arm 2 and the width of the cover equals a customary width of an eyeglass stem.

FIGS. 6-8 show the eyeglass temple assembly with a respective eyeglass temple cover 20 installed over each of the arms 2. To install the eyeglass temple cover 20, the clasp 10 is opened as is shown in the left clasp 10 in FIG. 3. Next, the arm 2 is inserted within the passage 31 of the sleeve 32 by inserting the arm 2 into the opening 35. The arm 2 is fully inserted when the stem hinge part 4 seats in the notch 21 in the inner surface 27 of the eyeglass temple cover 20 and when the arm socket 7 is aligned with the sleeve sockets 23 and 34. Next, the clasp 10 is closed by moving the clasp 10 relative to the arm 2. As the clasp 10 is moved, the pin 14 and ball 16 seat within arm socket 7 and sleeve sockets 23 and 34. In this way, the pin 14 and ball 16 hold the eyeglass temple cover 20 on the arm 2.

A preferred embodiment of a system of interchangeable eyeglass temple covers 20 includes eyeglasses 1 with the eyeglass temple assembly according to the invention. A plurality of eyeglass temple covers 20 is included in the system. The eyeglass temple covers 20 are different from each other. The eyeglass temple covers 20 are distinguished from each other by color and/or texture. The wearer interchanges eyeglass temple covers 20 to change and customize the appearance of the eyeglass temple covers 20 the eyeglasses 1.

I claim:

1. An eyeglass temple assembly for receiving, supporting and fastening an eyeglass temple cover, comprising:
an arm configured to be connected to an eyeglass rim and having an earpiece for resting on a wearer's ear, said arm having an arm socket formed therein, said arm being configured to have an eyeglass temple cover inserted over said arm with an opening formed in the eyeglass temple cover;
a clasp overlapping said arm and configured to overlap the eyeglass temple cover when the cover is inserted; and
a pin disposed on said clasp, said pin being removably insertable into said arm socket in said arm and being configured to insert in the opening in the eyeglass temple cover when the eyeglass temple cover is installed.

2. The eyeglass temple assembly according to claim 1, further comprising a clasp hinge interconnecting said arm and said clasp, said hinge allowing said clasp to be moved relative to said arm to insert and retract said pin from said socket.

3. The eyeglass temple assembly according to claim 2, wherein at least part of said clasp hinge is integrally formed with said arm.

4. The eyeglass temple assembly according to claim 1, further comprising a ball disposed on said pin, said ball being narrower than said socket.

5. The eyeglass temple assembly according to claim 1 wherein:
said arm has a lateral surface;
said socket is formed in said lateral surface; and
said clasp overlaps said lateral surface.

6. The eyeglass temple assembly according to claim 1, wherein said arm is made of metal.

7. The eyeglass temple assembly according to claim 1, wherein said arm is not greater than eight tenths of a millimeter.

8. The eyeglass temple assembly according to claim 1, further comprising a clasp ornament disposed on said clasp.

9. A cover for changing an aesthetic of an eyeglass arm with a pin, comprising:
a plastic sleeve having a passage with an opening formed therein for receiving the eyeglass arm inserted longitudinally into the passage, said passage complementing a shape of the eyeglass arm, said plastic sleeve further having a sleeve socket formed therein, said sleeve socket being configured to receive the pin to hold said plastic sleeve on the eyeglass arm,
wherein the socket is configured to receive the pin rotated into engagement with the plastic sleeve.

10. The cover according to claim 9, wherein said plastic sleeve is formed of silicone.

11. The cover according to claim 9, wherein said plastic sleeve as a hole formed therein, said hole being located distally relative to said opening.

12. The cover according to claim 9, wherein said plastic sleeve has a notch formed therein, said notch adjacent said opening, said notch being configured to receive at least part of a hinge disposed on the eyeglass arm.

13. The cover according to claim 9, wherein said plastic sleeve is textured.

14. The cover according to claim 9, wherein said plastic sleeve has a sleeve ornament disposed thereon.

15. The cover according to claim 14, wherein said ornament is molded into said plastic sleeve.

16. The cover according to claim 9, wherein said plastic sleeve has a further sleeve socket formed therein for receiving the pin, said further socket being formed on an opposite side of said passage than said socket.

17. The cover according to claim 9, wherein the plastic sleeve at least partially surrounds all lateral sides of the eyeglass arm.

18. The cover according to claim 9, wherein the plastic sleeve further comprises a closed end opposite the opening.

19. An eyeglass temple assembly with a changeable appearance, comprising:
an arm configured to be connected to an eyeglass rim and having an earpiece for resting on a wearer's ear, said arm having an arm socket formed therein, said arm being configured to have an eyeglass temple cover inserted over said arm;
a clasp overlapping said arm and configured to overlap the eyeglass temple cover when the cover is inserted;
a pin disposed on said clasp, said pin being removably insertable into said arm socket and being configured to insert In the opening in the eyeglass temple cover when the eyeglass temple cover is installed; and
the eyeglass temple cover including a plastic sleeve having a passage with an opening formed therein for receiving said eyeglass arm, said passage complementing a shape of the eyeglass arm, said plastic sleeve further having a sleeve socket formed therein, said sleeve socket being configured to receive said pin to hold said plastic sleeve on said eyeglass arm.

20. The eyeglass temple assembly according to claim 19, further comprising a hinge interconnecting said arm and said clasp, said hinge allowing said clasp to be moved relative to said arm to insert and retract said pin from said socket.

21. The eyeglass temple assembly according to claim 20, wherein at least a part of said hinge is formed integrally with said arm.

22. The eyeglass temple assembly according to claim 19, wherein said arm is not larger than eight tenths of a millimeter.

23. The eyeglass temple assembly according to claim 21, wherein:
said arm has a lateral surface;
said socket is formed in said lateral surface;
said clasp overlaps said lateral surface; said plastic sleeve is formed of silicone;
said plastic sleeve has a hole formed therein, said hole being located distally relative to said opening; and
said plastic sleeve has a notch formed therein, said notch abutting said opening, said notch being configured to receive at least part of a hinge disposed on the eyeglass arm.

* * * * *